(12) United States Patent
Bar-Yona

(10) Patent No.: US 6,805,506 B2
(45) Date of Patent: Oct. 19, 2004

(54) KEYBOARD WITH MULTIPLE INDICIA SETS

(75) Inventor: Itzchak Bar-Yona, Rosh Ha'Ayin (IL)

(73) Assignee: Lubartech Ltd., Omer (IL)

(*) Notice: Subject to any disclaimer, the term of this patent is extended or adjusted under 35 U.S.C. 154(b) by 255 days.

(21) Appl. No.: 10/101,470

(22) Filed: Mar. 20, 2002

(65) Prior Publication Data

US 2003/0180080 A1 Sep. 25, 2003

(51) Int. Cl.⁷ .................................................. B41J 5/08
(52) U.S. Cl. .................. 400/485; 235/145 R; 200/345; 200/DIG. 19; 378/436.07; 984/61; 341/22; 725/13; 178/170; 400/493
(58) Field of Search ................................ 400/485, 486, 400/487, 493, 494; 378/436.06, 436.07; 984/61; 341/22, 28; 725/13; 178/17 C

(56) References Cited

U.S. PATENT DOCUMENTS

| | | | |
|---|---|---|---|
| 1,590,998 A | * | 6/1926 | Balston ...................... 400/485 |
| 1,653,683 A | | 12/1927 | Whitker |
| 3,517,792 A | | 6/1970 | Abrahamsen et al. |
| 3,670,322 A | | 6/1972 | Mallebrein |
| 3,879,722 A | | 4/1975 | Knowlton |
| 4,480,932 A | | 11/1984 | Willcox |
| 5,378,069 A | * | 1/1995 | Bowen ...................... 400/477 |
| 5,408,060 A | | 4/1995 | Muurinen |
| 5,612,690 A | | 3/1997 | Levy |
| 6,226,906 B1 | | 5/2001 | Bar-Yona |
| 6,229,562 B1 | * | 5/2001 | Kremen ...................... 348/51 |
| 6,369,919 B1 | * | 4/2002 | Drinkwater et al. ............ 359/2 |
| D470,150 S | * | 2/2003 | Lewis, Jr. et al. ......... D14/453 |

FOREIGN PATENT DOCUMENTS

| | | |
|---|---|---|
| DE | 40 28 840 A1 | 2/1991 |
| ZA | 2000/3312 | 8/2001 |

OTHER PUBLICATIONS

Shigeo, Keyboard for Recorder of Character or the Like, *Patent Abstracts of Japan*: Pub. 59041038, Mar. 7, 1984.
Tetsuji, "Key Input Device", *Patent Abstracts of Japan*: Pub. 59035229, Feb. 25, 1984.

* cited by examiner

*Primary Examiner*—Eugene H. Eickholt
(74) *Attorney, Agent, or Firm*—Browdy and Neimark, P.L.L.C.

(57) ABSTRACT

The present invention discloses a method for displaying individually on a plurality of keys of a keyboard or keypad two or more indicia representing two or more functions performed by each key. The keys are characterized in that each of the two or more indicia is provided on the key in a plurality of separated portions. The portions being positioned in a spaced positioned relationship with one another, so as not to be physically closely juxtaposed. When viewed at a predetermined angle all parts of the indicia are optically juxtaposed to create the entire indicia.

36 Claims, 19 Drawing Sheets

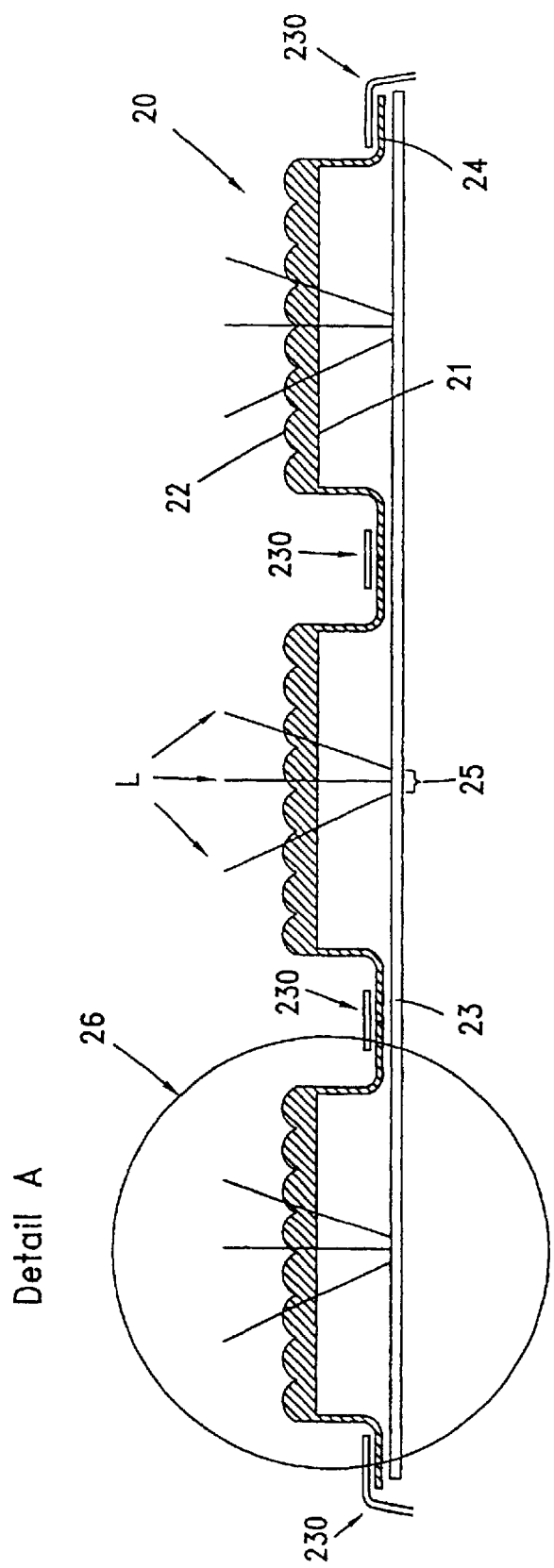

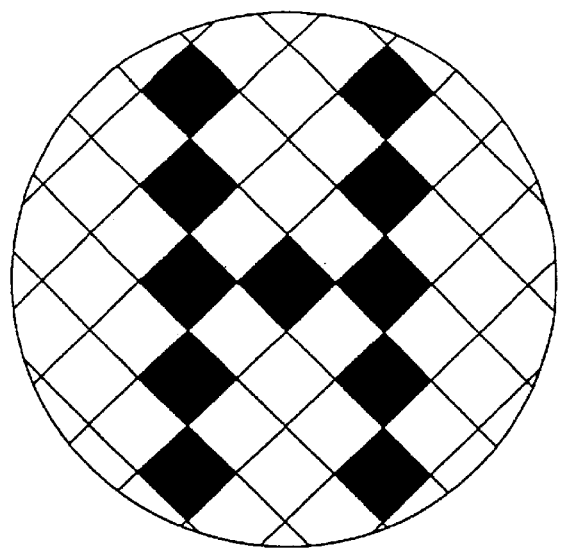
Fig. 13A
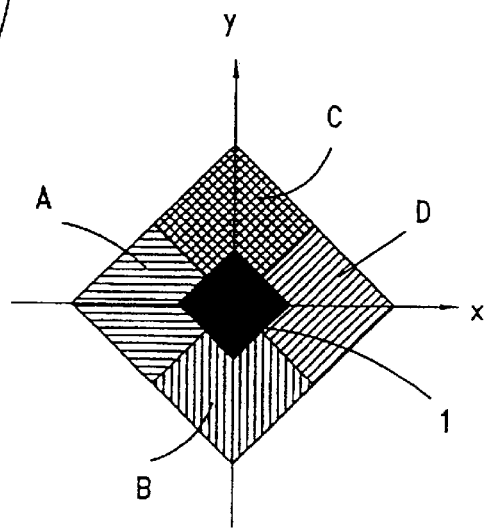
Fig. 13C
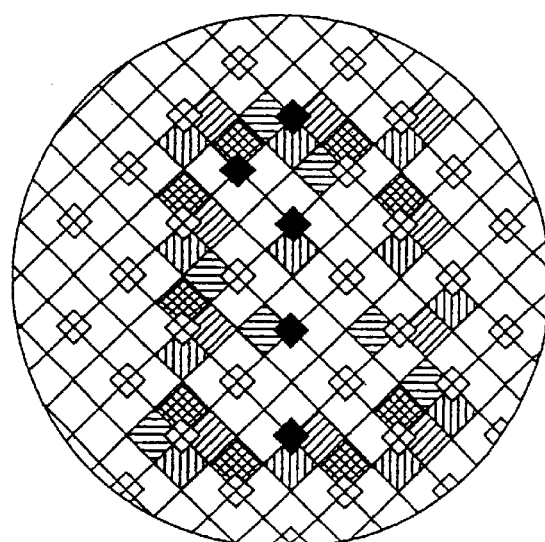
Fig. 13B
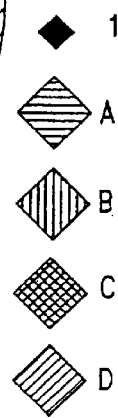

KEYBOARD WITH MULTIPLE INDICIA SETS

FIELD OF THE INVENTION

The present invention is related to keyboard type devices that contain a set of systematically arranged keys used to operate a machine or device. More specifically, the invention relates to keyboards or keypads in which each key is selectably able to perform a function chosen from one or more sets of functions and to means of clearly displaying on the face of the key which function has been selected for that key.

BACKGROUND OF THE INVENTION

In order to maximize the flexibility and reduce the number of individual keys on keyboards for input of data or instructions to machines and devices, such as typewriters, computers, telephones, etc., it is common practice to divide the total number of operations (functions) the keyboard is able to control into different subsets. The keyboard is provided with a control mechanism which allows the operator to choose which subset is required either for the entire keyboard or for each individual key. Within the chosen subset each individual key represents a different operation and when pressed will generate an appropriate signal. Switching to another subset will result in a corresponding change in the signal generated by each key. In order to display the alternate functions associated with each key to the user, the indicia for all the subsets are typically printed or engraved in some fashion on the individual keys. The difficulty with this is that typically there are two or more subsets and the keys are sometimes very small, therefore making it difficult for the operator to clearly see and to be able to easily distinguish between the various indicia on each key.

FIG. 1 is a photograph showing a portion of a dual-language (Hebrew-English) keyboard for a personal computer and FIG. 2 shows a typical keypad for a cellular telephone. Both photographs illustrate the crowded and often confusing arrangement of indicia on the face of each key. This difficulty has long been recognized and keyboard manufacturers have provided many ingenious, if usually complicated, solutions to the problem.

One of the early attempts at solving this problem is disclosed in U.S. Pat. No. 1,653,683. According to this patent, the indicia are written on the keys one behind the other, for example, numbers on the forward part of each key and letters behind. Each key is covered by a plate with a window large enough to allow only one of the indicia on each key to be seen at a time. The plates are connected to a mechanical mechanism that is in turn connected to a selecting mechanism such that, when, for example, the numerical function is selected, all the windows are pulled forward on the keys exposing the numbers and covering the letters.

A mechanical approach is used in U.S. Pat. No. 4,480,932 which discloses a mechanism for simultaneously rotating all of the keys on the keyboard. Each key has several characters on it and in each rotational position a different indicia, belonging to a common set of indicia for the entire keyboard, is brought into a readable position. Each key is connected to an electric circuit which provides an appropriate coded output to the device being controlled by the keyboard.

U.S. Pat. No. 3,517,792 combines a mechanical with an electrical approach. In a preferred embodiment of the invention disclosed in this patent, the individual hexagonally shaped keys are mounted on rods, one for each row of a typewriter keyboard, such that rotating the rod will bring a different face, corresponding to a different font type, of the key into view. The entire keyboard is arranged so that all the keys move together and the electronics of the system is integrated such that the indicia corresponding to the selected font type is typed when a key is pressed.

U.S. Pat. No. 3,879,722 discloses a computer input keyboard whose keys are automatically relabeled by optical transfer of computer-generated labels from a visual display device to the keyboard.

U.S. Pat. No. 3,670,322 describes a keyboard wherein each key contains a small cathode-ray tube on which the labels are generated under control of a computer.

The above described solutions are representative of many others. All of these proposed solutions are either too expensive and/or too time-consuming to operate and/or too complicated to adapt to modern keyboard devices. In these keyboards the manufacturers sometimes use color coding to distinguish between indicia associated with different subgroups, but this is an unsatisfactory solution since with time the colors often fade and, in any case, the difficulty of the size of the indicia remains. As shown in FIGS. 1 and 2 for two of the most widely used applications of keyboards today, the problem of clearly displaying multiple indicia on the face of each key is still unsolved.

It is therefore a purpose of this invention to provide a keyboard or keypad in which the multiple indicia representing the multiple functions of each key are displayed individually on the face of the key. The indicia that is displayed is determined by the choice of function made by the operator of the keyboard.

It is another purpose of this invention to provide a keyboard or keypad in which the multiple indicia representing the multiple functions of each key are displayed individually on the face of the key. The choice of indicia being displayed is determined by the operator of the keyboard by non-mechanical means and simply by changing the angle at which he views the keyboard.

It is yet another purpose of this invention to provide a keyboard or keypad in which the multiple indicia representing the multiple functions of each key are displayed individually and full-sized on the face of the key.

It is a further purpose of this invention to provide a method for providing a keyboard or keypad in which the multiple indicia representing the multiple functions of each key are displayed individually on the face of that key that is relatively inexpensive to produce and can be applied to virtually any input device that uses keys for selecting the information to be transferred to virtually any machine or device.

It is yet another purpose of the invention to provide a keyboard- or keypad-operated device in which the function of the keys is determined by the angle at which the device is held relative to the viewer.

Further purposes and advantages of this invention will appear as the description proceeds.

SUMMARY OF THE INVENTION

The method of the present invention, for displaying individually the multiple indicia representing the multiple functions of each key of a keyboard or keypad, comprises dividing each of the images of the individual indicia into portions that are then printed in a predetermined manner, each individual portion being printed spaced from the adjacent portions containing information from the same indicia. According to a preferred embodiment of the invention, the portions containing information from the other indicia are printed in the spaces between adjacent portions of the first indicia such that a single composite interlaced image, containing information about all the indicia, is produced. This composite image is produced on the top surface of the key either by being affixed to or printed directly on it. When observed from different angles and by appropriate means, the information contained in the composite image is separated such that the indicia are observed individually.

Throughout this specification the terms "keyboard" and "keypad" are used interchangeably/ and are meant to indicate any arrangement of two or more keys used to operate any electric or electronic device.

In the abovementioned preferred embodiment of the invention, the methods of producing the composite image and observing the individual indicia are based on known lenticular technology, although alternate preferred embodiments using other methods are also encompassed by the invention, as described hereinafter. The basic principle of lenticular technology as described in, for example, U.S. Pat. No. 6,226,906 band South African patent 2000/3312 by the same inventor, the descriptions of which are incorporated herein by reference, is well known to persons skilled in the art.

For each key of the keyboard, the set of indicia that is to be represented is printed, by lithography or some other suitable technique, or created by multiple injection or the like process, superimposed in an interlaced fashion. Suitable methods for producing the lithography are disclosed in, for example, the above-mentioned South African patent. The lithography is done either directly on the top surface of the key or on a substrate that is attached to the key by suitable means such as gluing. A sheet of lenticular lenses is then attached to the key above the print. Viewing through the lenses at different angles relative to the printing reveals the different indicia one at a time to an observer looking at the print through the lenses.

In U.S. Pat. No. 6,226,906 the viewer has a fixed angle of view and the relative motion is accomplished by physically moving the lenses relative to the stationary print or vice versa. In the present invention the small amount of relative motion needed to observe the separate indicia is provided by changing the angle of observation of the print through the lenses. This change of angle is accomplished by either tilting the keyboard relative to the stationary eyes of the observer or vice versa.

In one aspect, the present invention is directed towards providing a key for a keyboard comprising two or more indicia provided on its surface. The key is characterized in that each of two or more indicia is provided on the key in a plurality of separated portions. The portions being positioned in a spaced positioned relationship with one another so as not to be physically closely juxtaposed, and wherein, when viewed at a predetermined angle, all parts of the indicia are optically juxtaposed to create the entire indicia.

The key may have the portions of the two or more indicia interlaced so that more than one indicia occupy essentially the same area. When the portions of the two or more indicia are compressed and interlaced, lenses are provided to enlarge the portions and, when viewed from a predetermined angle, a complete indicia is generated. The lenses can comprise a sheet of lenticular lenses composed of an array of lenses of cylindrical or spherical lenses. The bottom surface of the sheet of lenticular lenses can be either planar or non-planar. If it is non-planar it has a symmetric structure that is dependent on the type of lenses on the top surface of the sheet.

The interlaced indicia on the key can be printed on the bottom of the lenticular sheet. In another embodiment, the separate portions of each of the indicia are provided in separate parallel planes provided in the key, one set of said parallel planes for each of the indicia. The sets of planes are essentially perpendicular to or at an angle with the surface of the key.

The indicia can be provided on the key by printing on a sheet which is attached to the body of the key or by injecting, printing or otherwise coloring the surface of the key. The different indicia printed on the key may be of different colors.

The key may be produced by a two-stage injection process in the first stage of which the body of the key is produced and, in the second stage, the indicia on the top surface of the body of the key. In another embodiment a three-stage injection process is used to produce the key. Where, in the first stage, the body of the key is produced, in the second stage, the indicia on the top surface body of the key, and, in the third stage, the lenses on top of the indicia.

In another aspect, the invention is directed towards providing a keyboard or keypad comprising a plurality of keys having the characteristics described hereinabove. The keyboard may be associated with angular orientation means and the angular orientation means may, or may not, comprise one or more gyroscopes.

In a further aspect, the invention is directed towards a method for displaying individually on a plurality of keys of a keyboard the two or more indicia representing two or more functions performed by the key. The method comprises:

dividing each of the individual indicia into portions;

positioning each of the individual portions in spaced positional relationship with respect to adjacent portions containing parts of the same indicia; and providing alternately, in the spaces between adjacent portions of the first indicia, portions containing information from the other indicia such that a single composite interlaced image, containing information about all of the indicia, is produced.

The composite image is produced on the top surface of the body of the key and, when observed from different viewing angles, the information contained in the composite image is separated such that the indicia are observed individually.

The composite image can be viewed through a sheet of lenticular lenses comprised of an array of cylindrical or spherical lenses. The bottom of the sheet of lenticular lenses can be either planar or non-planar. If it is non-planar it has a symmetric structure that is dependent on the type of lenses on the top surface of the sheet.

The number of indicia on each key is between 2 and 5 and the composite interlaced image is produced on the top surface of the body of the key by any suitable method, e.g., by a method chosen from the following group:

printing the image on a sheet and attaching the sheet by suitable means to the surface of the body of the key, and placing lenticular lenses thereon;

printing the image on the bottom surface of a sheet of lenticular lenses which is then attached to the surface of the body of the key by suitable means; and producing the image directly on the surface of the body of the key as part of the manufacturing process of the key.

According to a preferred embodiment of the method of the invention, the change in viewing angle can be associated with angular orientation means (i.e., means suitable to sense the direction in which the keyboard is being oriented, as will be further described hereinafter), which can comprise one or more gyroscopes.

According to another preferred embodiment of the invention, the method comprises dividing each of the individual indicia into portions and then providing each of the separate portions of each of the indicia in separate parallel planes provided in the surface of the body of the key. One set of parallel planes is provided for each indicia. When observed from different viewing angles, each of the indicia is observed individually. The sets of planes can be essentially perpendicular to the surface of the key or at an angle with the surface of the key.

In yet another aspect, the invention is directed towards providing a device comprising one or more of the keys described hereinabove.

In still a further aspect, the invention is directed towards providing a device comprising a keyboard of the type described hereinabove.

In yet a further aspect, the invention is directed towards providing a device wherein the function associated with pressing on any one of the keys of the keyboard is determined by angular orientation means attached to the device. The angular orientation means can be, for instance, gyroscopes. If the device is rigidly mounted on to a moving platform, then the gyroscope on the keyboard will also sense the movement of the platform. To limit the effect of the motion of the platforms the device is rigidly supported by an external structure comprising means to isolates it from the platform motion. An example of suitable means is a gyroscope driven servo system used to maintain the orientation of a device supported by gimbals.

All the above and other characteristics and advantages of the invention will be further understood through the following illustrative and non-limitative description of preferred embodiments thereof, with reference to the appended drawings.

BRIEF DESCRIPTION OF THE DRAWINGS

FIG. 9A is a schematic cross sectional view, according to a preferred embodiment of the invention, of the keypad of a cellular telephone;

FIGS. 13A to 13C schematically show another preferred embodiment of the invention;

DETAILED DESCRIPTION OF PREFERRED EMBODIMENTS

In this application, the words "keyboard" and "keypad" are used interchangeably, as are the words "key" and "button", to designate either device or other devices having similar structure and/or function. The words "indicia", "printing", "image", and "symbols" are used interchangeably to designate the symbols that appear on the surface of the body of a key to indicate the function of the key.

The invention will now be described primarily with reference to the examples of a dual-language computer keyboard and a keypad for a cellular telephone. These examples are provided merely to illustrate the invention and are not intended to limit its scope in any way. It should be understood that the invention can be applied mutatis mutandis to other devices such as pocket calculators, electronic dictionaries, wrist-watches with computing functions, etc.

According to the invention, each indicia is provided on the surface of the key body in a plurality of separated portions. The portions for each indicia are positioned in a spaced positioned relationship with one another, so as not to be physically closely juxtaposed. When viewed at a predetermined angle all parts of each indicia are optically juxtaposed to create the entire indicia.

Figure 3A:
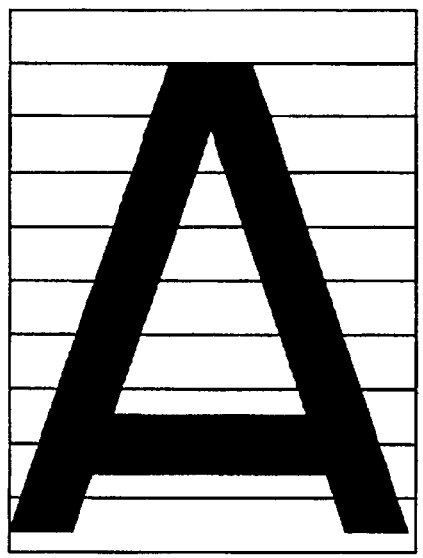
FIGS. 3A to 3C schematically illustrate one method of providing the interlaced images.
Figure 3B:
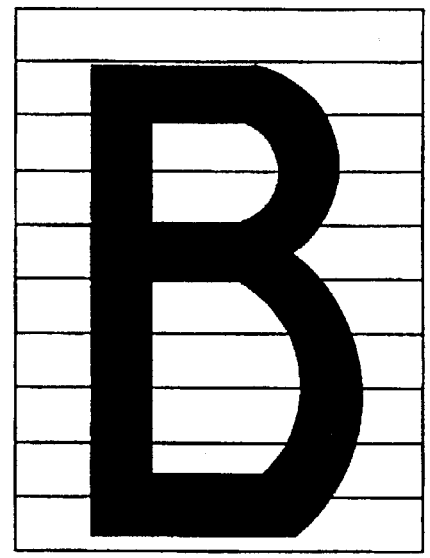
Figure 3C:
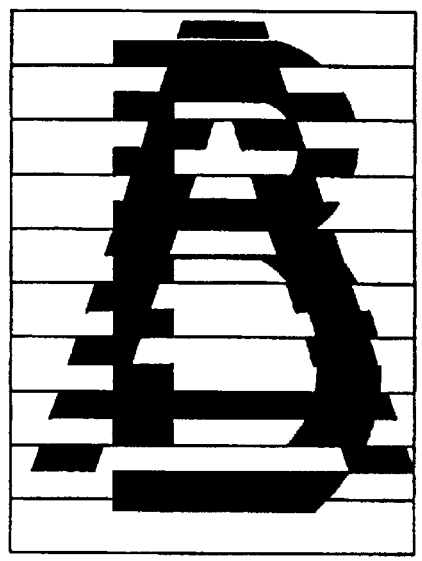

FIGS. 3A to 3C schematically illustrate the formation of interlaced images. This is one method of providing the indicia on the surface of the key body. FIGS. 3A and 3B show respectively the two letters that represent the alternate functions of the key. Each of the images is separately divided into horizontal strips, the information in each of these strips is compressed, and the composite interlaced image is constructed by starting with the first compressed strip of A then placing the first strip of B below it, the second strip of A below the first of B, etc. until the composite interlaced image shown in FIG. 3C is obtained. Additional methods of obtaining the composite interlaced image will be discussed below.

The composite interlaced image of FIG. 3C contains the information about both of the indicia. An array of lenses is placed over the interlaced image And, on viewing the image at slightly different angles, the information is separated such that the images are seen separately. In the case of the example shown in FIGS. 3A to 3C, the lenses are arranged to form a horizontally extending linear array of cylindrical lenses. Alternatively, the array of lenses can be a spherical, honeycomb, or other arrangement depending on the form of interlacing used for the composite image.

Figure 4C:
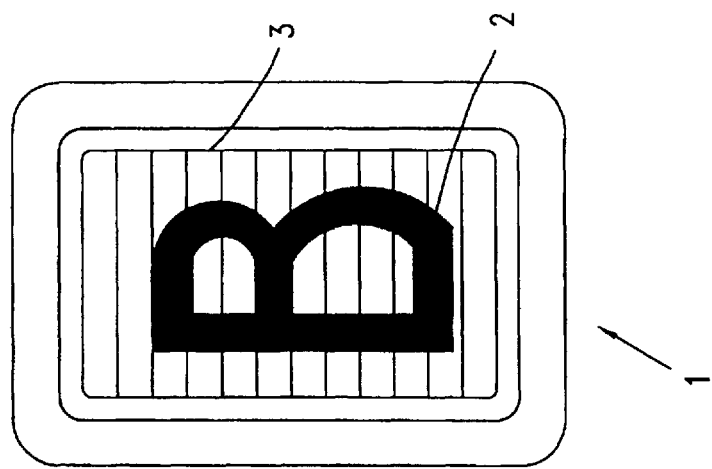
FIG. 4C schematically shows the face of the key when observed in a particular direction.
Figure 4B:
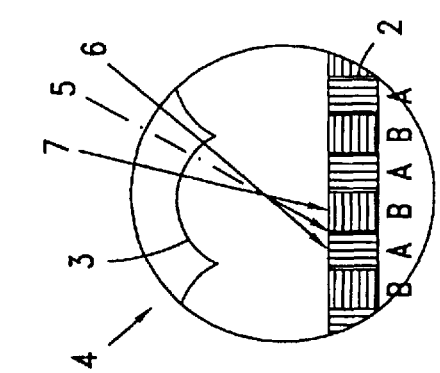
FIG. 4B shows an enlargement of a part of FIG. 4A.
Figure 4A:
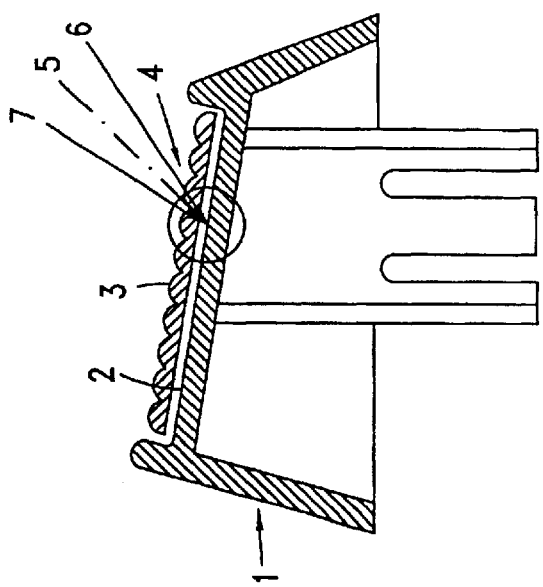
FIG. 4A is a schematic cross-sectional elevation view showing a computer keyboard key according to a preferred embodiment of the invention.

FIG. 4A is a schematic cross-sectional elevation view of a typical computer keyboard key 1 according to a preferred embodiment of the invention. On the top surface of the key is the printed information 2, of FIG. 3C, covered by a lenticular lens array 3. Numeral 4 designates an area shown enlarged in FIG. 4B. Arrows 5, 6, and 7 show the optimal viewing angle for a person using the keyboard and the viewing directions for seeing either the A or the B images. FIG. 4C schematically shows the face of the key when observed in the direction indicated by arrow 7.

Figure 5A:
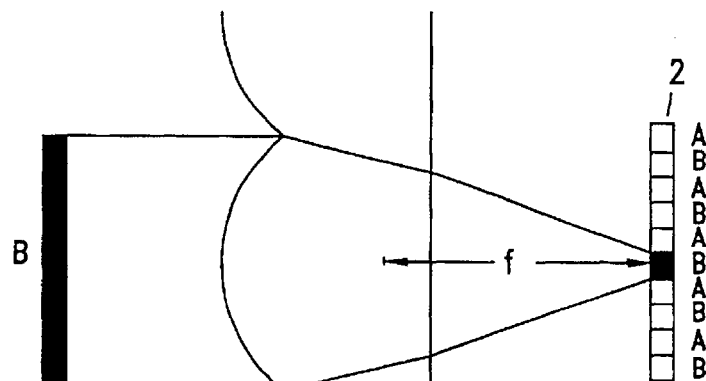
FIGS. 5A to 5C schematically show the critical importance of the alignment of the lenses of the array with the printed image.
Figure 5B:
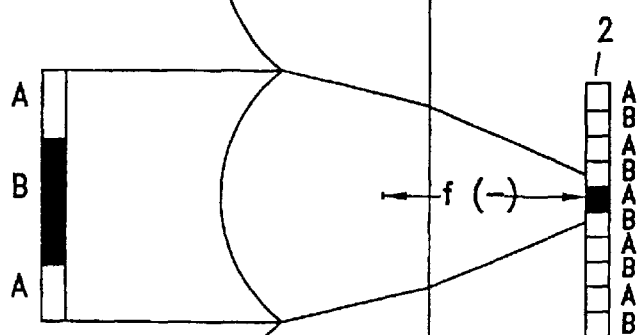
Figure 5C:
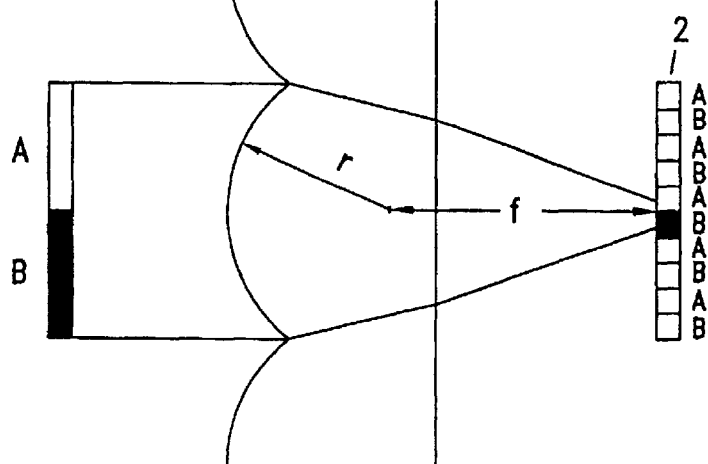

FIGS. 5A to 5C schematically show the critical importance of the alignment of the lenses of the array with the printed image. The views in these figures show an arrangement of printed image and lenses similar to that of FIG. 4B. Numeral 2 designates the printing and numeral 3 the cylindrical lenses having radius of curvature r and focal length f. On the left is schematically shown the image that would be seen by the viewer for the particular situation depicted in each figure. FIG. 5A shows the optimal situation in which each row of the printed image is positioned essentially at the focal point of the corresponding lens and the axis of the lens is aligned with the printed row. In this case, the viewer will see only the elements connected to the letter B. In FIG. 5B, the printed matter is positioned at a distance less than the focal length and the observed image contains information from both the A and the B (the result if the distance is greater than the focal length is essentially the same). In FIG. 5C the longitudinal axis of the lenses is not aligned with the row of the printed image. In this case, the content of each of the two indicia will vary from lens to lens across the face of the key leading to total mixing of the information from the two indicia in the observed image.

Figure 6:
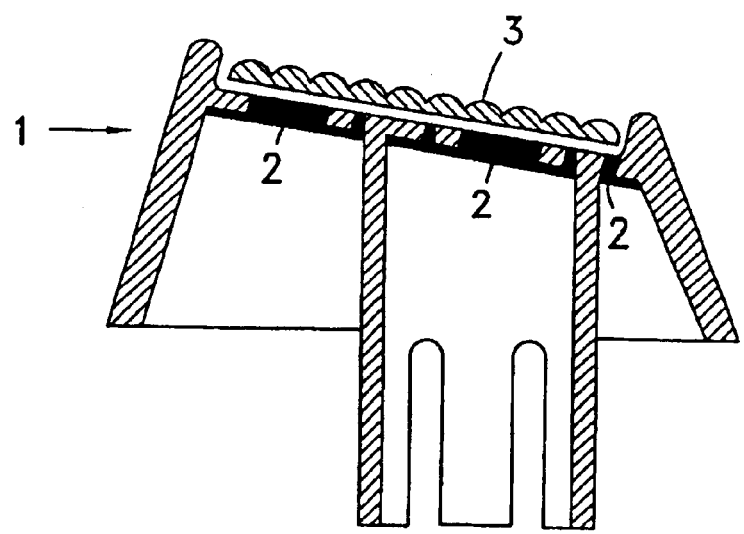
FIG. 6 schematically shows a keyboard key produced by using a two-stage extrusion process.

From the above, it follows that it will be difficult to insure the correct positional relationship between the lenses and the print if the composite interlaced image is printed on a sheet which is first attached to the surface of the body of the key, by suitable means such as gluing, and then the lens sheet is separately attached to the surface of the key, above the printing by similar means. There are several techniques for solving the alignment problem. One of these is to print the composite interlaced image on the bottom surface of the sheet comprising the array of lenses. Another method is shown in FIG. 6 which schematically shows a keyboard key 1 produced by using a two-stage injection process. In the first stage the body of the key is formed and then additional material 2, having a different color for contrast, is injected with great care from the bottom coming to the upper surface of the body of the key to form the composite interlaced image. In the final stage the lenses 3 are created by attaching a separate panel to the key above the composite image or by injecting them.

In another embodiment of the invention, the key shown in FIG. 6 is produced by a three-stage injection process. The first two-stages are as described hereinabove. In the third stage the lenses are created directly on the key, on top of the indicia, by injection of clear material. This embodiment has the advantage over other embodiments of much improved accuracy in alignment of the printed lines and the lens. This alignment is critical as is discussed hereinbelow. In addition, the monolithic structure of the key provides clearer viewing of the symbols since there are no interfaces between the print and the lenses.

Figure 1:
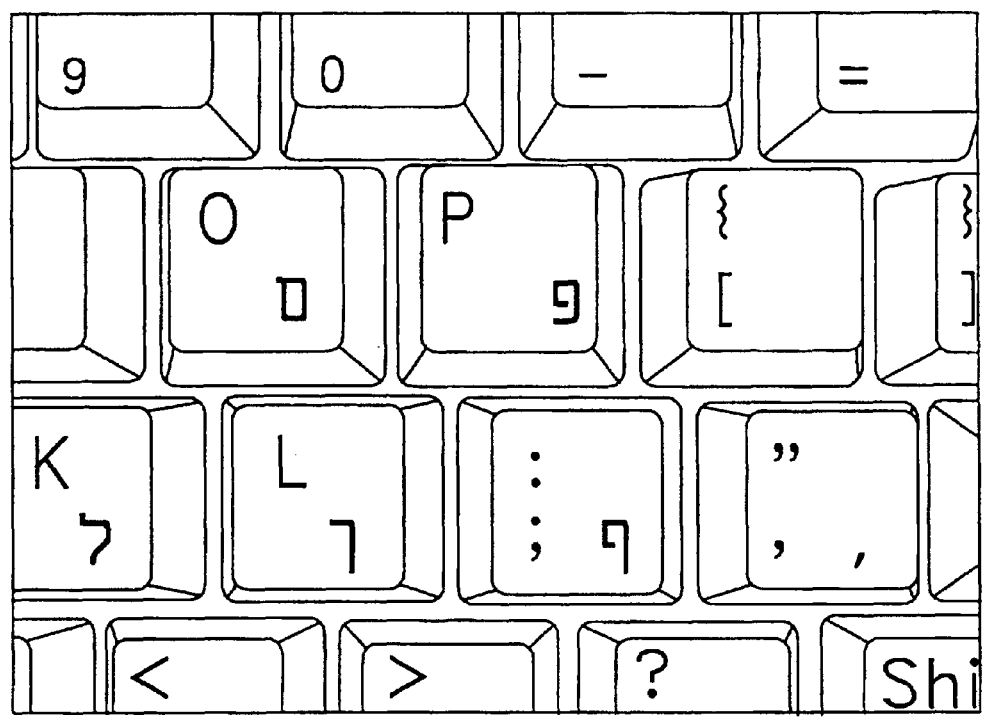
FIG. 1 is a photograph showing a portion of a dual-language keyboard for a personal computer.
Figure 7A:
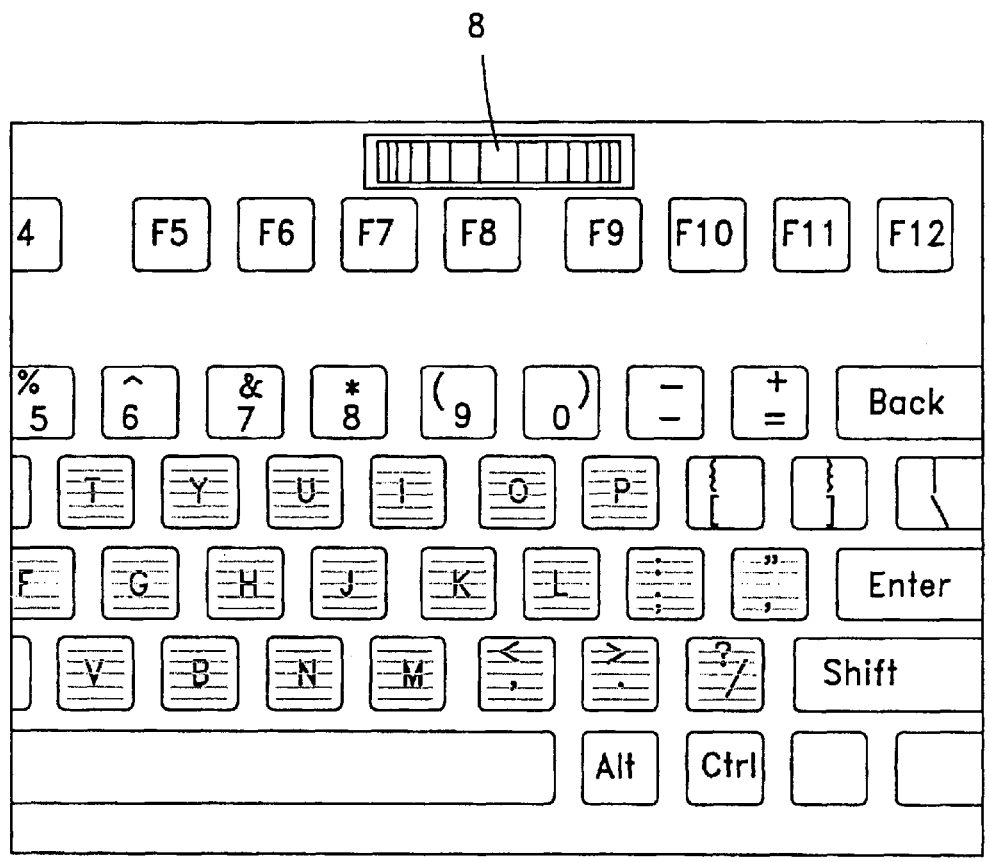
FIG. 7A is a schematic view of the entire computer keyboard shown in FIG. 1 with its keys replaced by keys produced according to the invention.

FIG. 7A is a schematic view of part of the computer keyboard shown in FIG. 1 with the keys having different functions, according to the language being used, replaced by keys produced according to the invention. This figure shows the situation in which the viewing angle has been adjusted such that only the indicia associated with the English language function of the keyboard are visible.

Just as for each individual key, the lenses must be accurately positioned with respect to the composite image; also strict conditions for alignment of all the keys on the keyboard must be satisfied if all the keys associated with a particular subset (language) are to be observed at the same time. The first condition is that the faces of all the keys must lie in parallel planes. Persons skilled in the art will know how to construct the keyboard such that this condition is satisfied.

The second condition follows from the optical requirements of the technology employed. One of the basic optical requirements in lenticular technology is that the lines of print and the axis of the linear lenses must be perfectly aligned. In practice this condition is normally satisfied if the lines of print are parallel to the axis of the lenses and it is not necessary that the center of the printed lines be located precisely under the center of the lenses. In the case of a keyboard the interwoven indicia are produced on separate key faces. Therefore, if all the keys associated with a particular subset (language) are to be observed at the same time, both the condition of parallelism and that of exact alignment of the centers of the printed lines and the lenses must both be met, for all of the keys. This requirement is exceptionally difficult to satisfy using normal methods of attaching the print and/or lenses separately to the keys. The three-stage injection process for producing the keys described hereinabove is therefore a preferred method for producing the keys with the required alignment of print and lenses.

FIG. 7A shows the keyboard as it would appear to an operator looking at the keys at a particular angle of sight. It is not necessary to replace all the keys on the keyboard with those of the invention (indicated by the horizontal lines on the face of the key) since some of the keys have the same functions in both languages. In order to change from the English letters to the Hebrew ones it is only necessary to slightly change the observation angle. This can be accomplished by rotating the eccentrically mounted wheel 8, which is more clearly seen in FIG. 7B, which is a schematic partial side-view of the keyboard of FIG. 7A, or to lift the support legs normally provided in the rear portion of most keyboards. Another, much simpler, way of changing the observation angle is for the operator to slightly tilt his head or body, as shown in FIG. 8.

Figure 2:
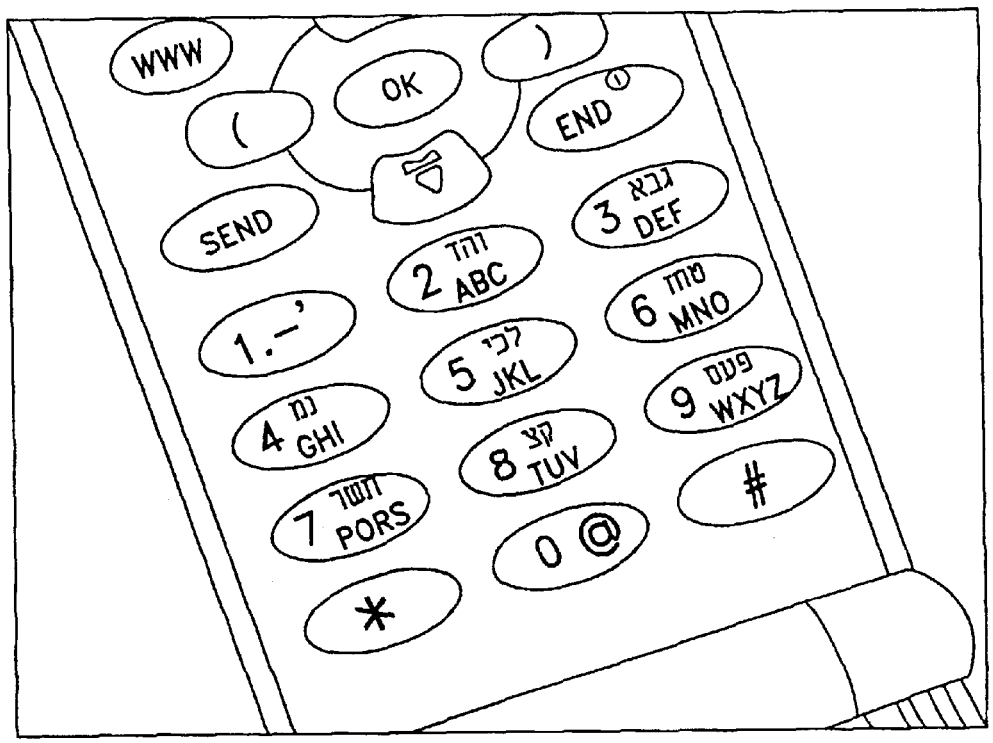
FIG. 2 is a photograph showing a typical keypad for a cellular telephone.

FIG. 9A is a schematic-cross sectional view, according to a preferred embodiment of the invention, along a line passing through the top surface of one of the rows of buttons on the keypad of a cellular telephone 20 that is structurally similar to the phone shown in FIG. 2. In FIG. 9A the case of the instrument has been removed; thereby exposing the printed circuit board (PCB) 23 and a formed flexible sheet 24, made by injection of a clear material such as silicon or polyurethane. Numeral 25 designates the light that illuminates the indicia on the face of the buttons (keys). The light passing through the keys (buttons) is schematically indicated as "L". The conductive disks that fit under the buttons to make electrical contact with the PCB when the button is pressed, as well as other conventional elements, are not shown. The phone mask elements that keep the PCB in place are indicated by numeral 230.

Figure 9B:
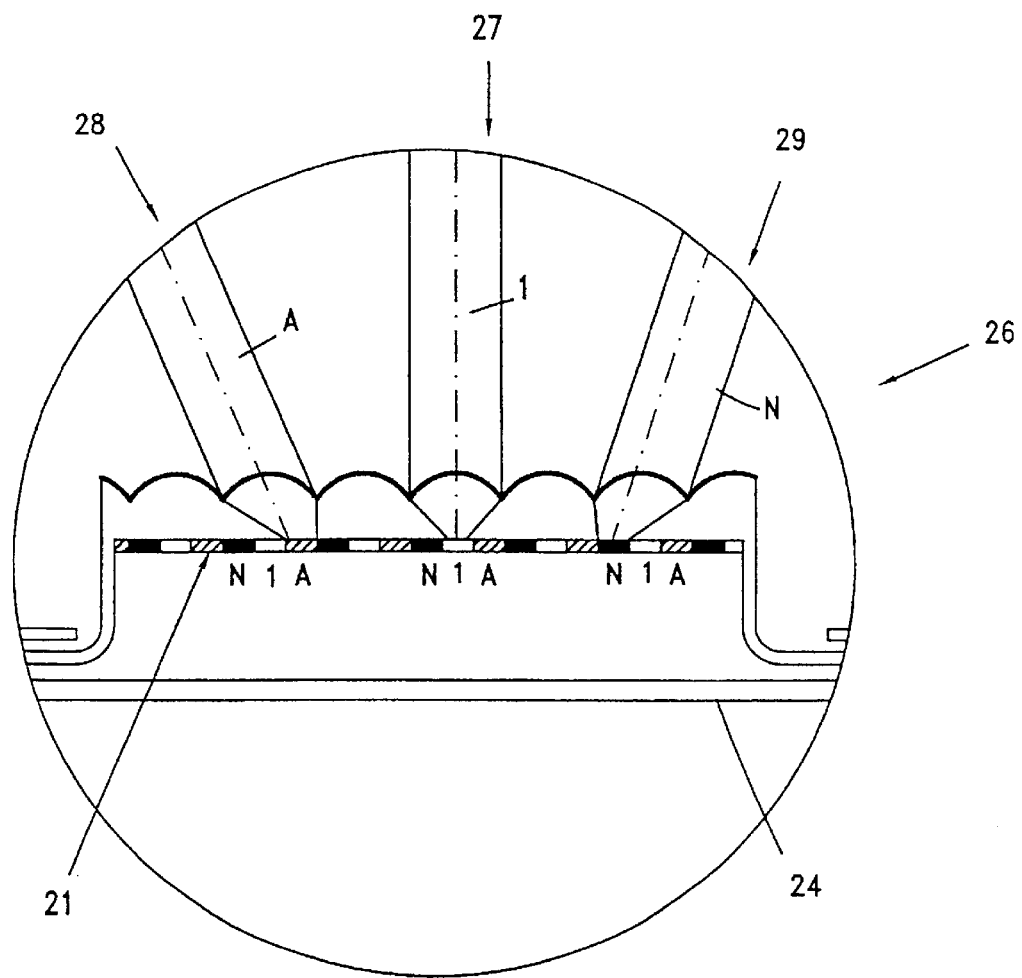
FIG. 9B is an enlargement of area in FIG. 9A.

FIG. 9B is an enlargement of area 26 in FIG. 9A. An image exists for each of the symbols representing each one of the functions of a particular button of the keypad. In this example, the button is capable of performing three functions, i.e. inputting either the numeral 1 or one of the letters A or N. Each of these images is separately divided into vertical strips, the information in each of these strips is compressed, and the composite interlaced image is constructed as discussed with reference to FIG. 3. In the case shown in FIG. 9B, the interlaced image is created by starting with the first compressed strip of A then placing the first strip of 1 next to it, followed by the first strip of N, the second strip of A next to the first of N, etc. until a composite interlaced image is obtained. The composite interlaced image, containing the information about all of the indicia representing the functions of the button is printed on the bottom side 21 of the flexible sheet at the location of the button. An array of lenses 22 is created as an integral part of the flexible sheet 24. On viewing the image through the array of lenses at slightly different angles, the information is separated such that the indicia are seen separately. Arrows 27, 28, and 29 indicate the respective direction of observation for viewing each of these indicia.

Figure 10:
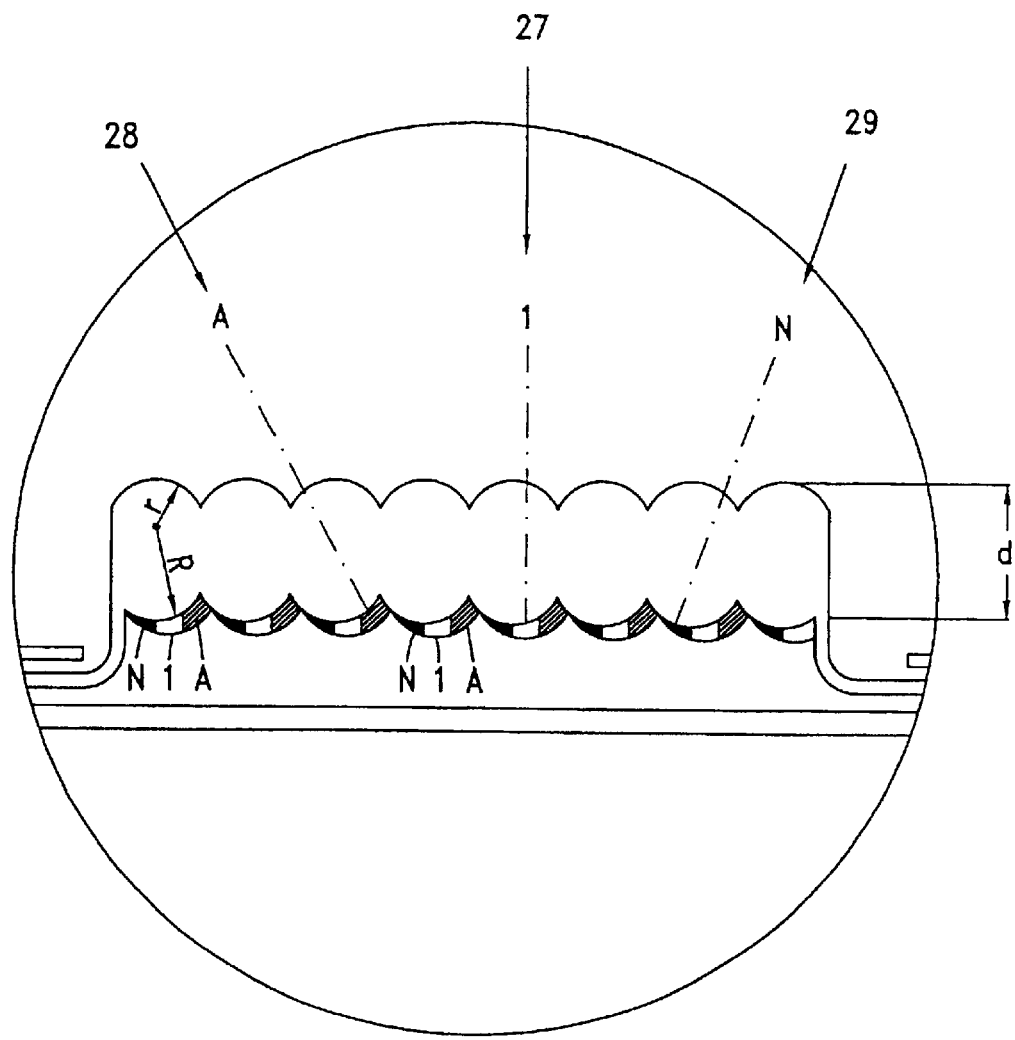
FIG. 10 schematically shows another preferred embodiment of the keypad of the invention.

FIG. 10 schematically shows another preferred embodiment of the keypad of the invention. In this case the bottom of the array of lenses is not planar, but constitutes a wave-like array composed of essentially identical parallel cylindrical surfaces, each surface having radius of curvature R. The thickness of the lens section is d=R+r, where r is the radius of curvature of the lens. In order to satisfy the optical condition necessary for viewing the images separately, d must be equal to the focal length f of the lenses. Thus, for each value of r there will be a suitable value of R. Typical values of r and R are for example: r=0.8 mm, R=1.2 mm and r=1.6 mm, R=2.4 mm.

The interlaced image can be printed on a separate sheet. However, although it is more difficult to print the interlaced image on a curved surface, it is generally preferred to print the image directly on the bottom side of flexible sheet 24 as shown in FIG. 10. In this manner the alignment of the printing with the lens is more accurate than in other alternatives, resulting in clearer images when viewing at different angles.

Figure 11A:
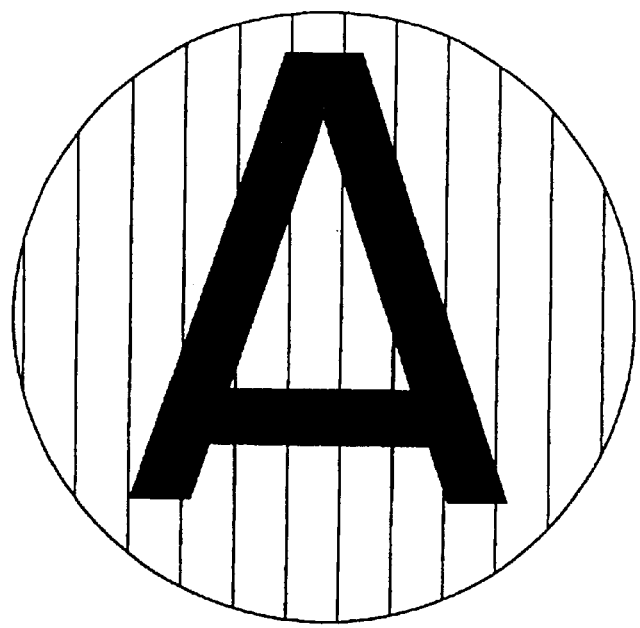
FIG. 11A schematically shows the view of one of the buttons on the telephone keypad displaying the letter "A"
Figure 11B:
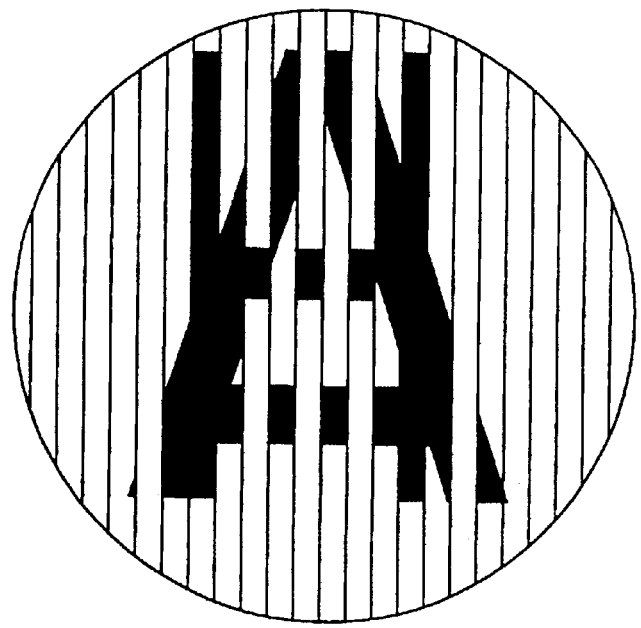
FIG. 11B schematically shows the view of one of the buttons on the telephone keypad displaying the composite interlaced image.
Figure 12A:
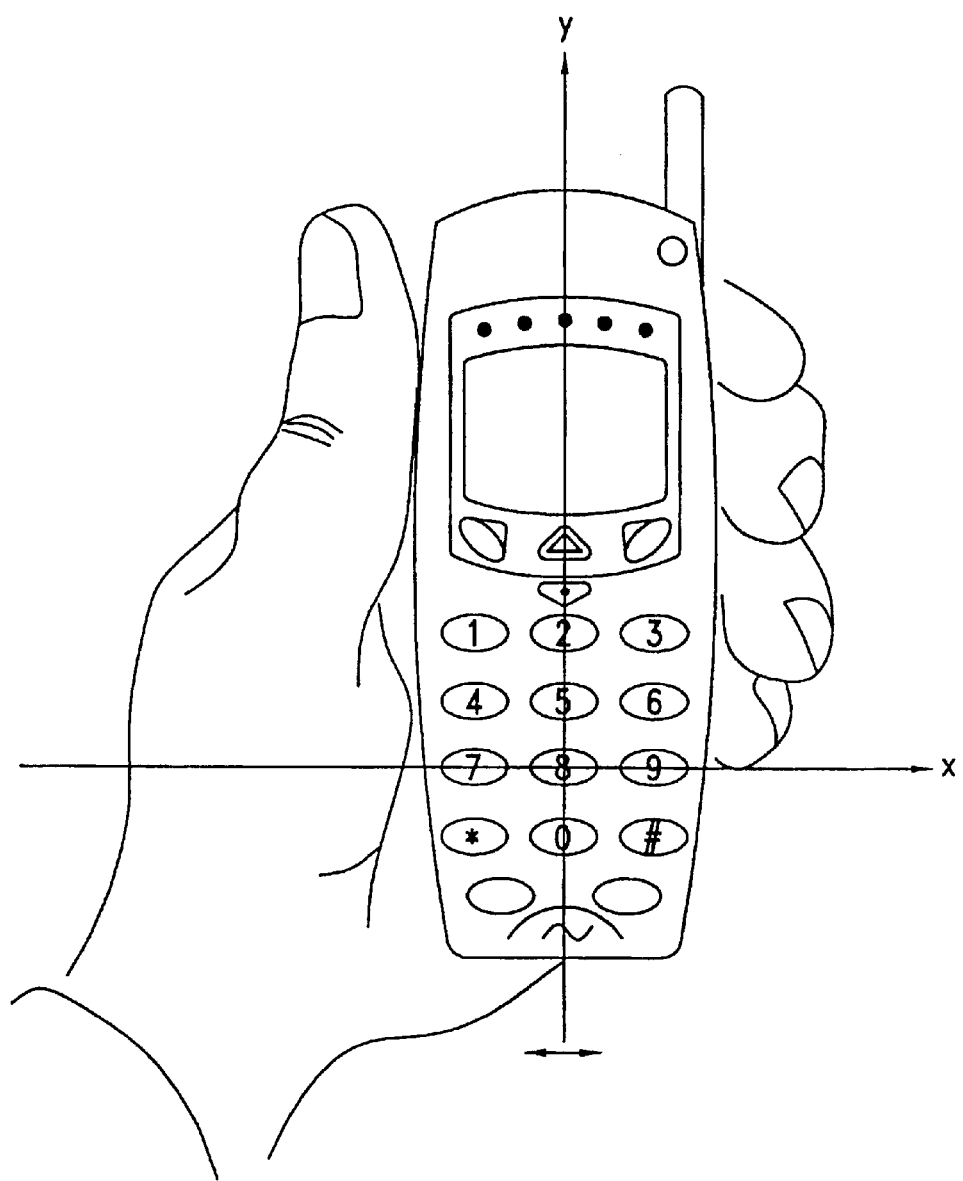
FIGS. 12A to 12C show how different indicia are seen on the face of the keys of a cellular phone according to a preferred embodiment of the invention.
Figure 12B:
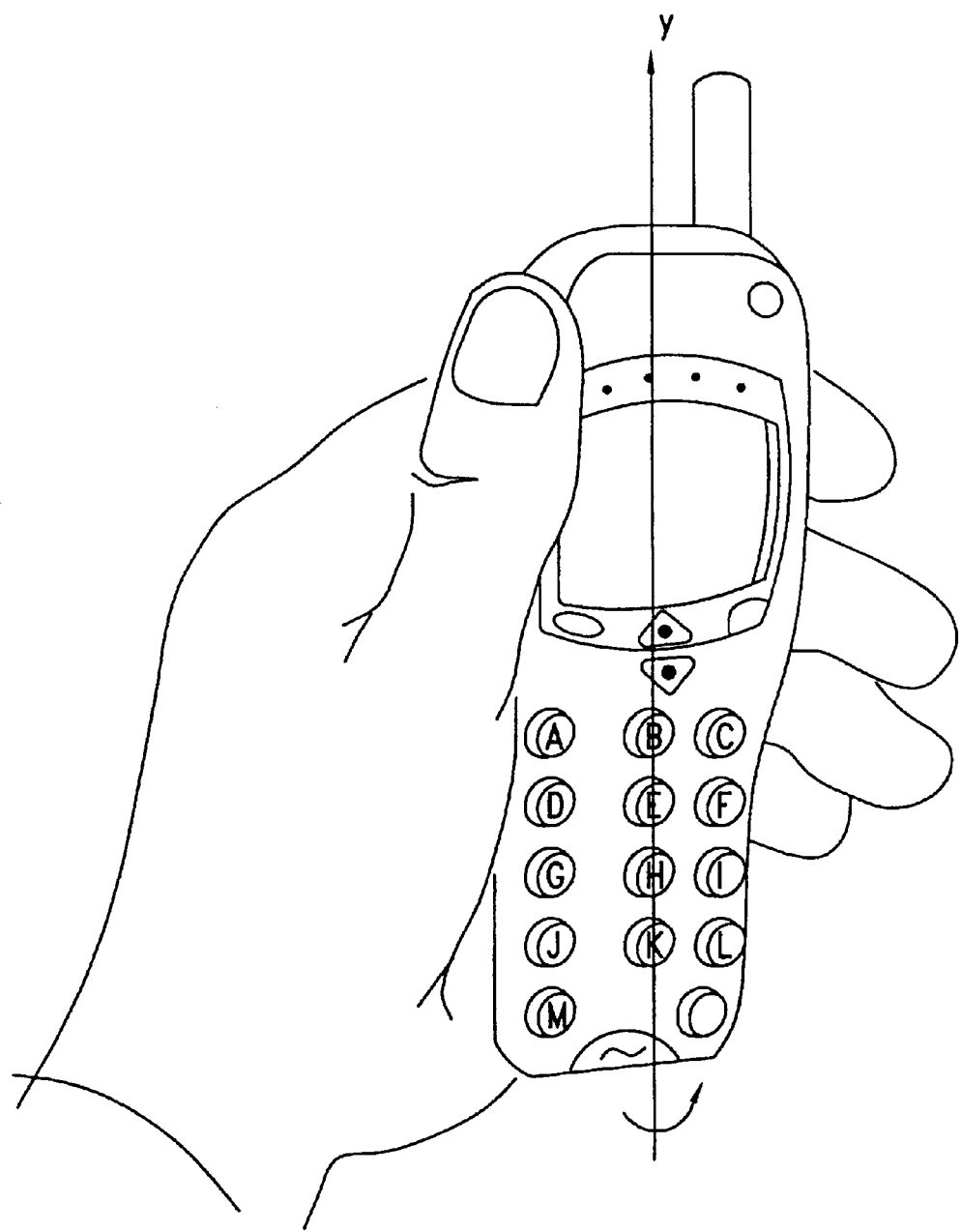
Figure 12C:
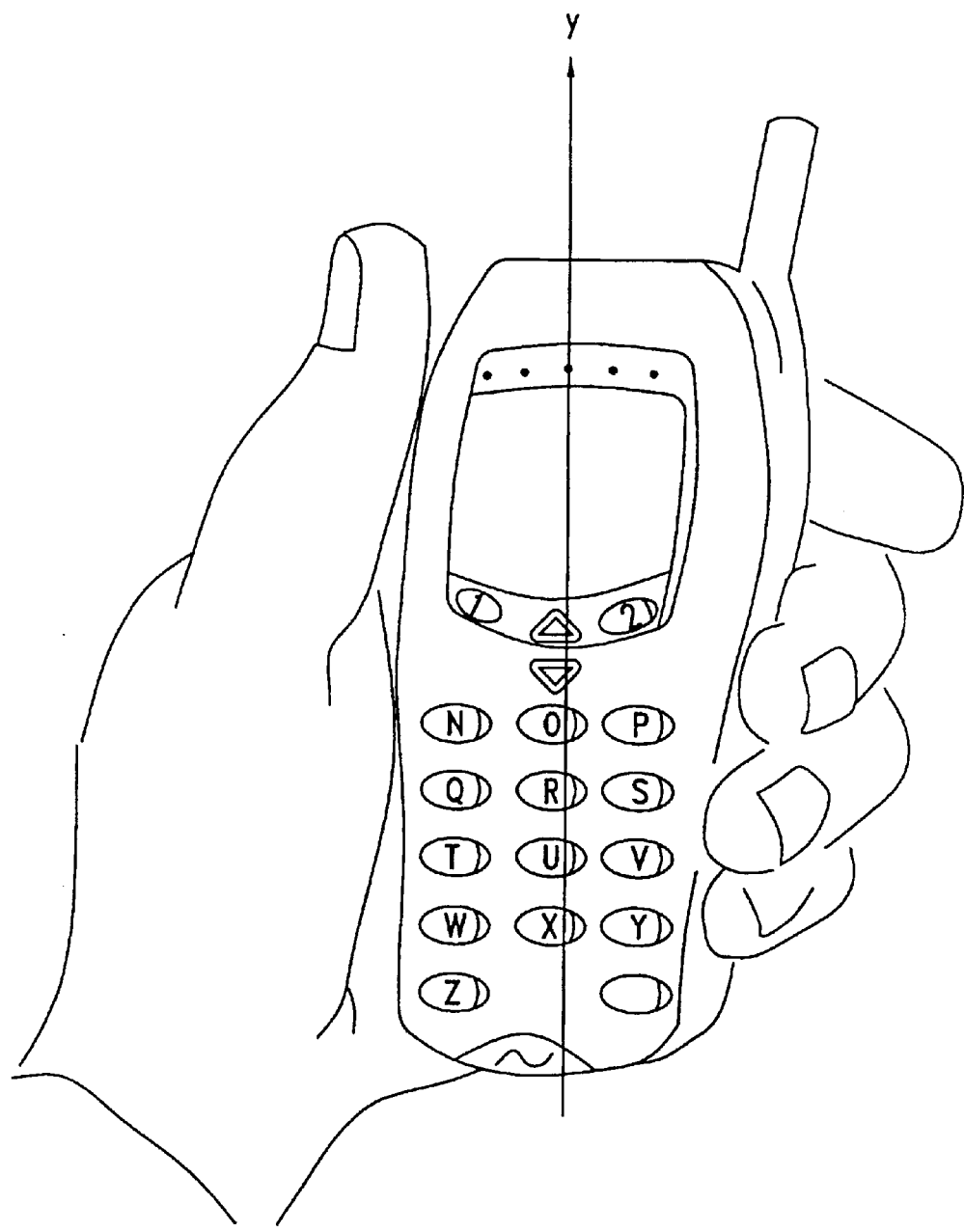

FIGS. 11A and 11B schematically show the view of one of the buttons on a telephone keypad, displaying the letter "A", and the composite interlaced image, showing the letters "A" and "H", respectively. FIGS. 12A to 12C show how the different indicia are seen on the face of the buttons. If the phone is held in the hand such that the perpendicular (z-axis) to the plane (defined by the x and y-axis) containing the faces of the buttons is the line of sight to the plane, then, for example then numerals "1" to "0" are visible as shown in FIG. 12A. This alignment of phone and operator is taken as the reference and tilting the phone clockwise or counter-clockwise around the y-axis reveals either the set of indicia "A" to "M" or "N" to "Z", as shown in FIGS. 12B and 12C.

It will be noted that using a linear interleafing and lens arrangement as described hereinabove it is possible to view a maximum of three subsets of indicia on the buttons of the keypad device. This number of subsets can be increased to five e.g., by using the embodiment shown in FIGS. 13A to 13C.

FIG. 13A shows the indicia "H" as it would appear on the surface of the button, and the array of lenses, which in this embodiment is an array of circular lenses. A schematic composite interlaced image in this embodiment is shown schematically in FIG. 13B. The interlaced image is composed of "unit cells" shown schematically in FIG. 13C wherein the information associated with each of the indicia is printed in the appropriate position. The x and y-axes shown in FIG. 13C for the unit cell are equivalent to the axes shown in FIGS. 12A to 12C for the entire keypad. From these figures it can be understood that, referring to FIG. 13C, looking in the z direction (the reference direction) the viewer will see the subset "1". Tilting the face of the phone clockwise or counter-clockwise around the y-axis will reveal the "A" or "D" subsets, and tilting it "forward" or "backward" around the x-axis will reveal the "B" or "C" subsets. This preferred embodiment allows additional information to be inputted into the device using a given number of buttons, or alternatively, and advantageously in many applications, such as wrist-watch type devices, allows the same amount of information to be inputted to the device with a reduced number of buttons on the keypad.

As will be understood by persons familiar with the use of the input devices to which the invention is directed, a mechanism has to exist for communicating to the device (computer or telephone, for example) which subset of indicia the operator wishes to work with, and to confirm to the operator that the device "understands" his intention. In other words, if a key or button is capable of representing either of the indicia "1" or "A", the device must "know" which of the functions the operator sees and the operator must know that the device "knows" what he is seeing. These conditions for successful operation of the devices of the invention can be satisfied in the manner used with conventional devices. For a computer keyboard clicking on an icon on the screen or pressing an appropriate key or combination of keys, for example simultaneously pressing the "Alt" and "Shift" keys, signals to the computer the change from one subset of indicia to another. With a telephone, pressing on a key once or several times, indicates the appropriate function. In all cases, the indicia produced on the display of the device indicate to the operator that the device understood his intention.

Figure 14:
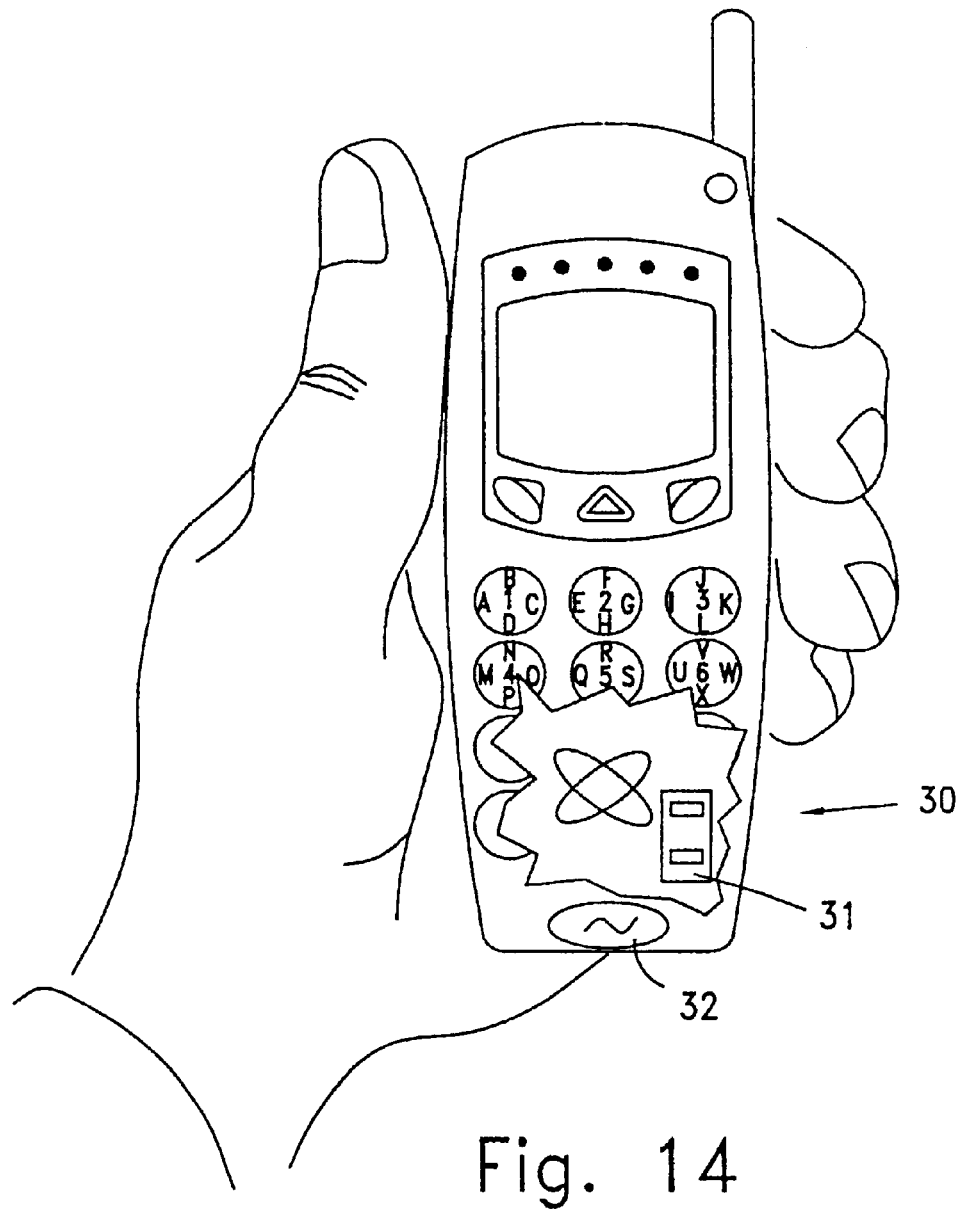
FIG. 14 is a partially cut away front-view symbolically showing a cellular telephone comprising a gyroscope according to a preferred embodiment of the invention.

The process can be automated and greatly simplified by use of one or more angular orientation methods, such as miniature electronic gyroscopes, to indicate the orientation of the keyboard relative to the operator. For example, this can be illustrated with reference to the preferred embodiment of the invention shown in FIG. 14. FIG. 14 is a partially cut away front view symbolically showing a cellular telephone 30 that employs an array of circular lenses. In the cut away section 31 there are shown symbolically one or more miniature electronic gyroscopes and their accompanying electronics, mounted on the printed circuit board of the telephone. In a preferred embodiment of the invention, two mutually perpendicular gyroscopes are mounted on the circuit board to indicate tilting relative to the x and y-axes. To use the device, the operator starts by tilting the phone until the numbers are visible on the face of each button. He then presses a "reset" button 32 to calibrate the unit. From this point on, tilting of the phone about either the x or y-axes is detected by the appropriate gyroscope which signals to the electronics of the phone which interpretation to give to the pressing of a button. Logical calibration can also be provided, e.g., by employing a sequence of tilting between different sets of indicia.

Figure 7B:
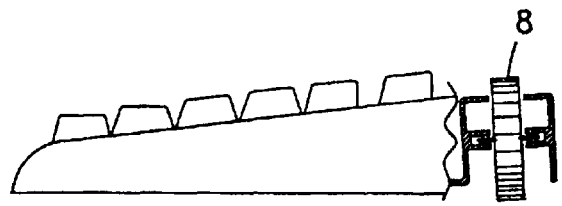
FIG. 7B is a schematic partial side-view of the keyboard of FIG. 7A.
Figure 8:
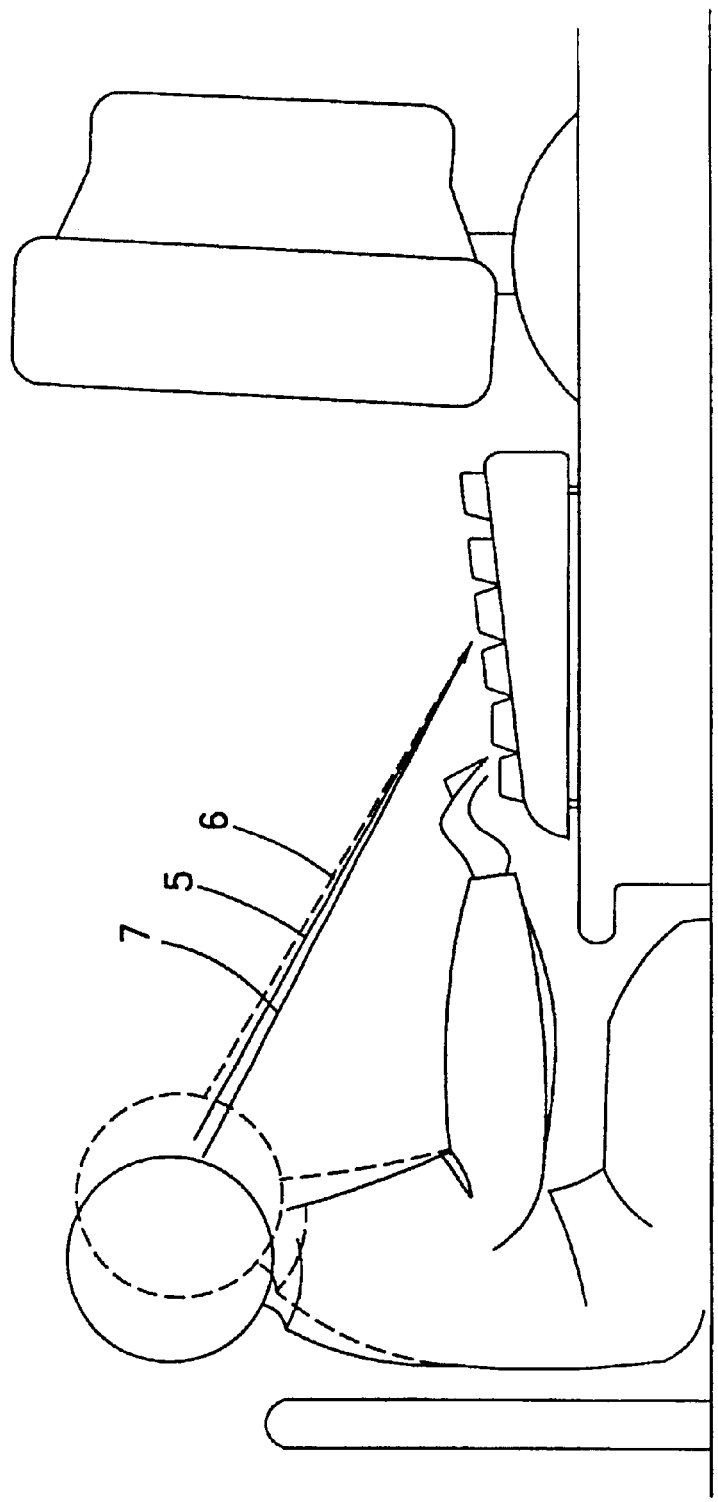
FIG. 8 schematically shows another way of changing the observation (i.e., viewing) angle.

While the use of gyroscopes, as described above, has obvious advantages for hand held systems, they can also be incorporated into devices such as the keyboard of FIGS. 7A and 7B, where the angle of view is changed by, for example, rotating an eccentrically mounted wheel to tilt the keyboard.

For the case of devices using gyroscopes, as described above, and rigidly mounted to a moving platform, then the gyroscope on the keyboard will also sense the movement of the platform. An example of this type of situation is a mobile phone mounted in a vehicle. In order to allow the gyroscope on the keyboard to detect the angle of the keyboard relative to the observer independently of the motion of the vehicle, the phone is rigidly supported by an external structure comprising means to isolates it from the vehicular motion. An example of a suitable solution to the problem is to mount the phone in gimbals and to employ a gyroscope driven servo system to maintain the orientation of phone and driver.

A typical commercially available gyroscope that is suitable for use in the present invention is a model CG-L43 ceramic gyro manufactured by Tokin. Many other types of miniature gyroscope are known in the art and the design of appropriate modifications of the electronics of a particular device for a particular application will be well known to the person familiar with such devices and will not be further discussed here for reasons of brevity.

Figure 15B:
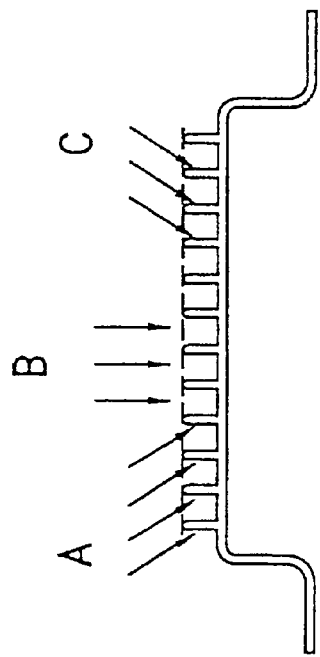
FIG. 15B schematically illustrates yet another preferred embodiment of the invention, which is used to display three separate indicia.
Figure 15A:
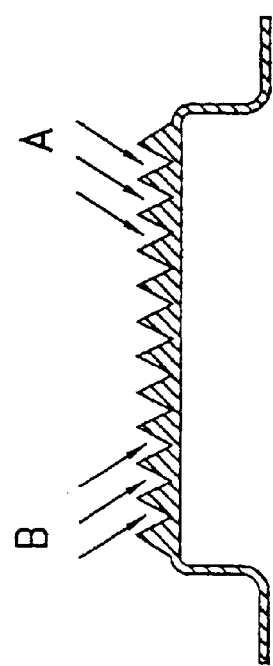
FIG. 15A shows another preferred embodiment of the invention for displaying two sets of indicia on a single key of a keyboard.

FIGS. 15A and 15B are cross-sectional views of the upper face of a key which schematically show alternative preferred embodiments of the invention that do not employ lenticular technology. In these embodiments, a symmetric repeating three-dimensional structure is created on the upper face of the key or button and the information relating to the different indicia is attached to appropriate locations in such a way that a composite interlaced image appears on the face of the key at the appropriate angle. The different indicia represented by the same key can be observed individually by changing the angle of view of the composite image.

FIG. 15A shows an embodiment of the invention for displaying two sets of indicia on a single key of a keyboard. In this embodiment, parallel, equi-spaced v-shaped grooves, typically of a depth of about 1–2 mm, are created in the surface of the key. The information needed to produce the indicia "A" is sliced into strips, one strip for each groove, and the strips are attached to, or printed on, the left side of the groove in consecutive order from one side of the key to the other. Similarly the information for "B" is arranged on the right side of the groove. Looking at the key from one of the sides, as shown in the figure, reveals just one of the indicia.

FIG. 15B schematically illustrates an embodiment of the invention that is used to display three separate indicia. In this embodiment, parallel, equi-spaced channels having a "square well" cross-sectional shape are created. The printing for each of the indicia is respectively applied to the left and right walls and to the bottom of the well. Viewing the face of the key from different angles, as shown in the figure, reveals one of the indicia at a time. In other embodiments the walls of the well can be slanted such that the angle between the bottom of the well and the side is slightly larger than 90 degrees.

Figure 16:
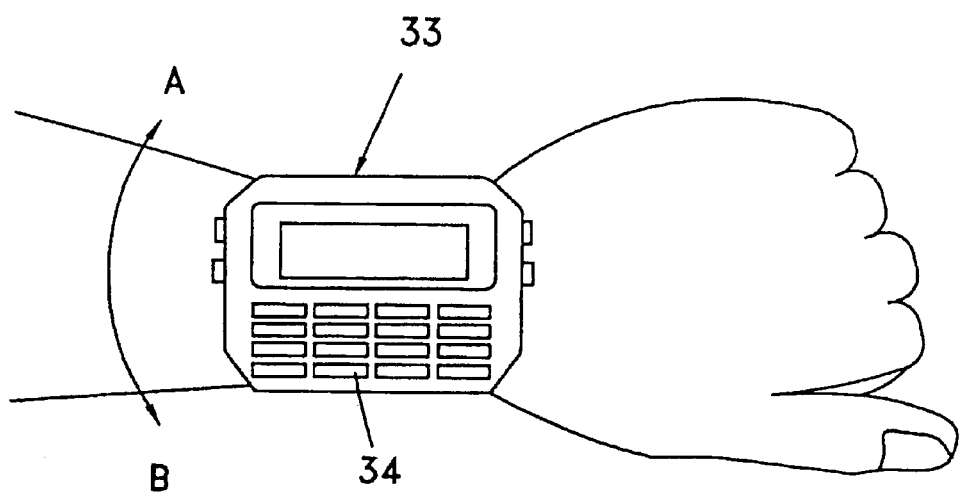
FIG. 16 schematically illustrates the use of one preferred embodiment of the invention with a wrist-watch.

FIG. 16 schematically shows a wrist watch 33 of the type sometimes termed "data bank". This watch is provided with a keyboard 34, in which each key typically comprises two or three indicia (not shown). According to this particular embodiment of the invention, different indicia are shown when the wrist is rotated in the direction of arrows A–B.

Although embodiments of the invention have been described by way of illustration, it will be understood that the invention may be carried out with many variations, modifications, and adaptations, without departing from its spirit or exceeding the scope of the claims.

What is claimed is:

1. A key for a keyboard, a keypad, or the like, comprising two or more indicia provided on the surface of the key body, characterized in that each of said two or more indicia is provided on said key in a plurality of separated portions, said portions being positioned in a spaced positioned relationship with one another, so as not to be physically closely juxtaposed, and wherein when viewed at a predetermined angle all parts of said indicia are optically juxtaposed to create the entire indicia.

2. A key according to claim 1, wherein the portions of the two or more indicia are interlaced and compressed so that more than one indicia occupy essentially the same area as a single indicia.

3. A key according to claim 1, wherein lenses are provided to enlarge the portions of one of said two or more indicia, when viewed from a predetermined angle, thereby to generate a complete indicia.

4. A key according to claim 3, wherein the lenses comprise a sheet of lenticular lenses.

5. A key according to claim 3, wherein the sheet of lenticular lenses is composed of an array of lenses chosen from the group comprised of:
cylindrical lenses; and
spherical lenses.

6. A key according to claim 5, wherein the bottom surface of the sheet of lenticular lenses is non-planar.

7. A key according to claim 2, wherein the interlaced indicia are printed on the bottom of the lenticular sheet.

8. A key according to claim 1, wherein the separate portions of each of the indicia are provided in separate parallel planes provided in the key, one set of said parallel planes for each of said indicia.

9. A key according to claim 8, wherein the sets of planes are essentially perpendicular to the surface of said key.

10. A key according to claim 8, wherein the sets of planes are all at an angle with the surface of said key.

11. A key according to claim 1, wherein the indicia are provided by printing on a sheet which is attached to the surface of the body of said key, or by injecting, printing or otherwise coloring the surface of the key.

12. A key according to claim 11, wherein a two-stage injection process is used to produce, in the first stage, the body of said key and, in the second stage, the indicia on the surface of said body.

13. A key according to claim 11, wherein a three-stage injection process is used to produce, in the first stage, the body of said key, in the second stage, the indicia on the surface of said body, and, in the third stage, the lenses on top of said indicia.

14. A key according to claim 8, wherein different indicia are of different colors.

15. A keyboard comprising a plurality of keys according to claim 1.

16. A keyboard according to claim 15, associated with angular orientation means.

17. A keyboard according to claim 15, wherein the angular orientation means comprises one or more gyroscopes.

18. A device comprising one or more keys according to claim 1.

19. A device comprising a keyboard according to claim 15.

20. A device according to claim 19, wherein the function associated with pressing on any one of the keys of the keyboard is determined by angular orientation means attached to said device.

21. A device according to claim 20, wherein the angular orientation means are gyroscopes.

22. A device according to claim 20, wherein said device is rigidly supported by an external structure.

23. A device according to claim 22, wherein said external structure comprises gimbels.

24. A device according to claim 22, wherein means attached to the external structure are used to maintain a fixed orientation between said device, rigidly supported by said external structure, and the operator of said device.

25. A device according to claim 24, wherein the means comprise a gyroscope driven servo mechanism.

26. A method for displaying individually on a plurality of keys of a keyboard or keypad two or more indicia representing two or more functions performed by each key, the method comprising:

dividing each of the individual indicia into portions;

positioning each of said individual portions in a spaced positional relationship with respect to the adjacent portions containing parts of the same indicia;

providing alternately, in the spaces between adjacent portions of the first indicia, portions containing information from the other indicia such that a single composite interlaced image, containing information about all of said indicia, is produced;

wherein said composite image is produced on the top surface of said key and, when observed from different viewing angles, the information contained in said composite image is separated such that said indicia are observed individually.

27. A method according to claim 26, wherein the composite image is viewed through a sheet of lenticular lenses.

28. A method according to claim 27, wherein the sheet of lenticular lenses is composed of an array of lenses chosen from the group comprised of:

cylindrical lenses; and spherical lenses.

29. A method according to claim 28, wherein the bottom of the sheet of lenticular lenses is non-planar.

30. A method according to claim 26, wherein the number of indicia on each key is between 2 and 5.

31. A method according to claim 26, wherein the composite interlaced image is produced on the key by a method chosen from the following group:

printing said image on a sheet and attaching said sheet by suitable means to said key;

printing said image on the bottom surface of a sheet of lenticular lenses which is then attached to said key by suitable means; and producing said image directly on the surface of said key as part of the manufacturing process of said key.

32. A method according to claim 26, wherein the change in viewing angle is associated with angular orientation means.

33. A method according to claim 32, wherein the angular orientation means comprise one or more gyroscopes.

34. A method for displaying individually on each key of a keyboard or keypad two or more indicia representing the two or more functions performed by said key, said method comprising:

dividing each of the individual indicia into portions;

positioning each of said separate portions of each of the indicia in separate parallel planes provided in the key, one set of said parallel planes for each of said indicia;

wherein, when observed from different viewing angles, each of said indicia is observed individually.

35. A method according to claim 34, wherein the sets of planes are essentially perpendicular to the surface of the key.

36. A method according to claim 34, wherein the sets of planes are all at an angle with the surface of the key.

* * * * *